(12) United States Patent
Nishimura et al.

(10) Patent No.: US 9,354,357 B2
(45) Date of Patent: May 31, 2016

(54) WATER SOLUBLE HIGH SYNDIOTACTIC POLYVINYL ALCOHOL

(71) Applicant: Sekisui Specialty Chemicals America, LLC, Dallas, TX (US)

(72) Inventors: Yohei Nishimura, Houston, TX (US); Regan Pollock, Houston, TX (US); Richard Vicari, Houston, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 187 days.

(21) Appl. No.: 14/165,241

(22) Filed: Jan. 27, 2014

(65) Prior Publication Data

US 2014/0213727 A1     Jul. 31, 2014

Related U.S. Application Data

(60) Provisional application No. 61/757,480, filed on Jan. 28, 2013.

(51) Int. Cl.
| | |
|---|---|
| *C08F 16/06* | (2006.01) |
| *B29D 7/01* | (2006.01) |
| *G02B 1/08* | (2006.01) |
| *C08F 218/12* | (2006.01) |

(52) U.S. Cl.
CPC ............... *G02B 1/08* (2013.01); *C08F 218/12* (2013.01)

(58) Field of Classification Search
CPC ............ G02B 1/08; C08F 16/00; C08F 16/06
USPC .......................................................... 525/60
See application file for complete search history.

(56) References Cited

U.S. PATENT DOCUMENTS

| | | | | | |
|---|---|---|---|---|---|
| 5,047,272 A | * | 9/1991 | Hasselb32b | .............. | B32B 7/12 359/487.02 |
| 5,187,226 A | * | 2/1993 | Kamachi | .................. | C08F 8/12 525/330.5 |
| 5,661,101 A | * | 8/1997 | Washizu | ................. | B41M 5/32 427/152 |

FOREIGN PATENT DOCUMENTS

EP        0389833 A1      10/1990

OTHER PUBLICATIONS

Yeum et al., Polymer, 45, 4037-4043, 2004.*
International Search Report and Written Opinion issued May 6, 2014 in corresponding International application No. PCT/US2014/013177 (9 pages).
Nagara Y et al: "Properties of hihgly syndiotactic poly(vinyl alcohol)"; Polymer, Elsevier Science Publishers B.V. GB, vol. 42, No. 24, Nov. 1, 2001, pp. 9679-9686 (8 pages).
Correspondence reporting Office Action and Search Report issued Jan. 15, 2015 in corresponding Taiwan application No. 103102934 (9 pages).

* cited by examiner

*Primary Examiner* — Hui Chin
(74) *Attorney, Agent, or Firm* — Osha Liang LLP

(57) ABSTRACT

A water soluble polyvinyl alcohol copolymer having a diad syndiotacticity of greater than about 60% and less than about 70%. In some embodiments, the water soluble polyvinyl alcohol copolymer is soluble in water at a concentration of at least 1 wt % at a temperature of less than 100° C. In other embodiments, the composition is soluble in water at a concentration of at least 5 wt % at a temperature in the range from about 90° C. to less than 100° C. The high solubility of the high syndiotactic poly vinyl alcohols disclosed herein may provide various advantages as described herein, including ease of processing and decreased use of harmful solvents.

17 Claims, No Drawings

WATER SOLUBLE HIGH SYNDIOTACTIC POLYVINYL ALCOHOL

FIELD OF THE DISCLOSURE

Embodiments disclosed herein relate generally to water soluble polyvinyl alcohol compositions, where the polyvinyl alcohol composition has a high degree of syndiotacticity and exhibit a relatively high water solubility, even at room temperature or slightly elevated temperatures, such as less than 100° C.

BACKGROUND

Polyvinyl alcohol (PVOH) is a useful polymer as it exhibits excellent tensile and impact strengths, abrasion resistance, and interfacial properties, among other advantageous properties. As such, PVOH is used in films, fibers, paper processing, adhesives and numerous other end products.

PVOH films may be used, for example, in unit dose packaging films, as an oxygen barrier film, and in polarizing films. PVOH/iodine complex films, for example, are an excellent polarizing material used in liquid crystal displays. PVOH may form a complex with iodine as the polyiodide ions interrupt the intermolecular hydrogen bonds. Unfortunately, iodine may desorb from the complex under hot and humid conditions. Desorption of iodine is especially troublesome when the PVOH is atactic, e.g., having a diad syndiotacticity of less than about 53%. Syndiotactic PVOH exhibit a lower degree of desorption, as described in "Preparation of Syndiotacticity-Rich High Molecular Weight Poly(vinyl alcohol)/Iodine Polarizing Film with High Water Resistance," by Man Ho Han and Won Seok Lyoo, J. Applied Polymer Science, Vol. 115, 917-922 (2010).

Unfortunately, syndiotactic PVOH exhibit a strong intramolecular hydrogen bond, as described in "Properties of highly syndiotactic poly(vinyl alcohol)," by Yoshitaka Nagara et al., Polymer, Vol. 42, 9679-9686 (2001). The strong intramolecular hydrogen bond results in a decrease in solubility of syndiotactic PVOH in solvents, including water, DMSO, ethylene glycol, and glycerol, among others. For example, as reported therein, water temperatures of 127° C. may be required to dissolve 0.1 g syndiotactic PVOH in a deciliter of water.

Decreased solubility in solvents may results in use of harsher operating conditions, more toxic solvents, and difficulties in process operations when forming the polymer, such as due to the formed polymer falling out of solution and agglomerating on agitators, reactor walls, and other unit operations.

Decreased solubility in solvents may also result in the need for harsher operating conditions, more toxic solvents, and difficulties in converting the syndiotactic polymer to useful end products, such as films.

SUMMARY OF THE DISCLOSURE

In one aspect, embodiments disclosed herein relate to a composition including a water soluble polyvinyl alcohol copolymer having a diad syndiotacticity of greater than about 60% and less than about 70%. The compositions may be used, for example, to form polarizing films.

In another aspect, embodiments disclosed herein relate to a method of preparing a polarizing film. The method may include: dissolving a water soluble polyvinyl alcohol copolymer, having a diad syndiotacticity in the range from greater than about 60% to less than about 70%, in water at a temperature of less than 100° C. to form an aqueous solution; casting a film from the aqueous solution; infusing the film with iodine to form a polyvinyl alcohol—iodine complex; and stretching the film.

In another aspect, embodiments disclosed herein relate to a process for forming a water-soluble high syndiotactic polyvinyl alcohol composition. The method may include: copolymerizing at least one of vinyl pivalate, vinyl trifluoroacetate, vinyl trichloroacetate, and vinyl formate and at least one solubilizing comonomer to form a copolymer; saponifying the copolymer to produce a polyvinyl alcohol copolymer having a degree of hydrolysis of at least 95%; wherein the polyvinyl alcohol copolymer has a diad syndiotacticity of greater than about 60% to less than about 70% and is soluble in water at a temperature of less than 100° C. at concentrations of greater than 1 wt %.

Other aspects and advantages will be apparent from the following description and the appended claims.

DETAILED DESCRIPTION

In one aspect, embodiments disclosed herein relate to water soluble polyvinyl alcohol compositions, where the polyvinyl alcohol composition has a high degree of syndiotacticity and exhibit a relatively high water solubility, even at room temperature or slightly elevated temperatures, such as less than 100° C.

Syndiotactic polyvinyl alcohol compositions may be formed by copolymerizing a vinyl ester, such as vinyl pivalate, vinyl trifluoroacetate, vinyl trichloroacetate, and/or vinyl formate, with one or more solubilizing comonomers. In some embodiments, the Syndiotactic polyvinyl alcohol compositions may be formed by the random copolymerization of a vinyl ester, such as vinyl pivalate, vinyl trifluoroacetate, vinyl trichloroacetate, and/or vinyl formate, with one or more solubilizing comonomers. In some embodiments, other vinyl esters may also be used as a comonomer, such as vinyl acetate, vinyl butyrate, and vinyl versatate, among others.

Solubilizing comonomers useful in embodiments herein may include N-vinylpyrrolidone, N-vinyl imidazole, N-vinyl caprolactam, N-vinyl formamide, 2-acrylamido-2-methyl propane sulfonic acid, acrylamide, N,N-dimethyl acrylamide, N-(isobutoxymethyl) acrylamide, vinyl ether, acrylic acid, crotonic acid, itaconic acid, maleic acid, allyl alcohol, hydroxypolyethoxy allyl ether, vinyl sulfonate, sodium 1-allyloxy-2-hydroxypropyl sulfonate, and 3-dimethylamino propyl methacrylamide, and 4-vinyl-1,3-dioxalan-2-one, among others. In some embodiments, the vinyl ether solubilizing comonomer may include at least one of vinyl tert-butyl ether and vinyl trimethylsilyl ether.

Solubilizing comonomers may be incorporated into the resulting copolymer in amounts ranging from about 0.5 mol % to about 25 mol %. For example, solubilizing comonomers may be incorporated into the resulting copolymer in amounts ranging from about 0.75 mol % to about 20 mol %, from about 1 mol % to about 10 mol %, and from about 1.5 mol % to about 5 mol % in various embodiments.

In some embodiments, the water soluble polyvinyl alcohol may be formed by copolymerization of vinyl pivalate, vinyl trifluoroacetate, vinyl trichloroacetate, and/or vinyl formate, with a solubilizing comonomer, such as N-vinyl pyrrolidone. For example, the copolymer may include up to about 20 mol % solubilizing comonomer, such as up to about 20 mol % N-vinyl pyrrolidone. In some embodiments, the copolymer may include at least 80 mol % vinyl pivalate and up to about 20 mol % N-vinyl pyrrolidone as a solubilizing comonomer.

Copolymerization may be performed, for example, via bulk polymerization, solution polymerization, emulsion polymerization, suspension polymerization, and the like. Copolymerization conditions may include any temperature appropriate for the polymerization of the vinyl esters, such as in the range from about −80° C. to about 300° C. Copolymerization may be performed using a free radical initiator, such as a peroxide or azobisisobutyronitrile (AIBN) initiator, among others.

The vinyl ester copolymer thus obtained may be saponified to form a vinyl alcohol copolymer. Saponification may be performed, for example, by contacting the vinyl ester copolymer with an alkali to result in ester exchange or direct hydrolysis. Examples of alkali compositions useful in embodiments herein include alkali metal hydroxides such as potassium hydroxide, sodium hydroxide and lithium hydroxide, and alkali metal alcoholates such as sodium methoxide, sodium ethoxide, potassium methoxide, potassium ethoxide and potassium t-butoxide, among others. Solvents useful for performing the saponification may include cyclic ethers such as tetrahydrofuran and dioxane; ketones such as acetone, methyl ethyl ketone, methyl isobutyl ketone and pinacolin; sulfoxides such as dimethyl sulfoxide; hydrocarbons such as toluene, benzene, n-hexane and cyclohexane; and alcohols such as methanol, ethanol, isopropyl alcohol, n-propyl alcohol, n-butanol, isobutanol, sec-butanol, t-butanol, amyl alcohol and cyclohexanol; and mixture of these, among other compounds capable of swelling or dissolving the vinyl ester copolymer and/or the resulting vinyl alcohol copolymer.

The saponified vinyl alcohol polymer may then be isolated for further processing and/or end uses. For example, any remaining alkali in the composition may be neutralized, the polymer washed and dried, to recover a purified high syndiotactic polyvinyl alcohol copolymer. The manner of isolation may depend on the solubility of the resulting vinyl alcohol copolymer in the process solvents used, and may include anti-solvent precipitation, drying, or a combination thereof.

Following saponification and isolation, the vinyl alcohol copolymer may have a degree of hydrolysis in the range from about 95% to about 99%, as indicated by $H^+$NMR analyses. The resulting vinyl alcohol copolymers may have a degree of polymerization of at least 250, 300, 500, 750, 1000, 1500, or 2000, and a number average molecular weight of greater than 30,000, 50,000, 70,000, or 100,000 in embodiments. The degree of polymerization may be characterized by the viscosity of the copolymer (4.0 wt % polymer in water) measured on a Brookfield viscometer at 20° C., which in some embodiments may be greater than 250 cP, 300 cP, 400 cP, or 500 cP in various embodiments, where, depending on the test, may be measured using a spindle size from about 18 to about 34 and at an rpm in the range from about 0.6 to about 30 rpm.

The water soluble polyvinyl alcohol compositions thus produced may have a diad syndiotacticity of greater than 60%, 61%, 62%, 63%, 64%, or 65% as a lower limit, and up to about 70% or 75% as an upper limit, where any lower limit may be combined with any upper limit. In some embodiments, the water soluble polyvinyl alcohol compositions produced may have a diad syndiotacticity of greater than 60% to less than about 70%.

Water soluble, as defined herein, indicates that the polymer composition is at least 85% soluble in water at a temperature of less than 100° C. and at a concentration of at least 1 wt %; concentrations of at least 2 wt % in other embodiments; and at concentrations of at least 5 wt %, 10 wt %, 15 wt %, or 20 wt % in yet other embodiments. In some embodiments, the polyvinyl alcohol compositions disclosed herein may have a diad syndiotacticity of greater than 60%, 61%, 62%, 63%, or 64% and are soluble in water at temperatures of from about 80° C., 85° C., 90°, or 95° C. to about 95° C., 96° C., 97° C., 98° C., 99° C., and less than 100° C., at ambient pressure conditions, where any lower limit may be combined with any upper limit, at concentrations of at least 1 wt %, 2 wt %, 5 wt %, 10 wt %, 15 wt %, 20 wt %, or greater.

The above-described water soluble high syndiotactic polyvinyl alcohol copolymer compositions may be used in fibers, packaging materials, gas barrier materials, optical films, filters, membranes, and other end products. In some embodiments, the above-described water soluble high syndiotactic polyvinyl alcohol copolymer compositions may be used in optical films, such as polarizing films for use in liquid crystal displays, lenses, or the like.

The high syndiotactic water soluble polyvinyl alcohol copolymers according to embodiments herein may be used to form polarizing films having a high durability and a high polarizing efficiency. For example, a water soluble polyvinyl alcohol copolymer according to embodiments herein may be dissolved in water to form an aqueous solution. The aqueous solution may be used to cast a film. The high syndiotactic water soluble polyvinyl alcohol copolymers may then be infused with iodine to produce a polyvinyl alcohol copolymer/iodine complex film. Iodine infusion may be performed by swelling or soaking a polyvinyl alcohol copolymer with a solution comprising $I_2$ and/or potassium iodide (KI) solution, in an appropriate solvent, to result in polyvinyl alcohol—iodine complexation. In some embodiments, an $I_2$, potassium iodide (KI) and boric acid solution may be used. Due to the solubility of the copolymer in various solvents, including water, complexation times as compared to "water resistant" polyvinyl alcohol compositions may be decreased. For example, in some embodiments, the required soaking or complexation time may be less than about 2 minutes, such as from about 15 seconds to about 60 seconds, and may be conducted at a temperature in the range from about 15° C. to about 35° C., such as from about 20° C. to about 30° C., or about 25° C. In other embodiments, an aqueous solution including the polyvinyl alcohol copolymer and an iodine source may be dried to form the desired polyvinyl alcohol—iodine complexation. Following casting and infusion, the films may be stretched, such as to about 5 times initial length, to form a polarizing film. Advantageously, polarizing films according to embodiments herein may be formed at ambient pressure conditions.

Polarizing films formed according to embodiments herein may have an initial polarization efficiency of at least 90%; at least 95%, 98%, or 99% in other embodiments. Even though the syndiotactic polyvinyl alcohol copolymers disclosed herein are water soluble, the complex films may nonetheless exhibit a low iodine desorption under high heat and high humidity conditions. The syndiotactic polyvinyl alcohol copolymers have been found to exhibit a greater affinity for iodine, once the complex is formed, than for water. While not "water resistant," complex films formed using copolymers according to embodiments herein may retain a high degree of polarization efficiency, such as a change ratio of the polarizer effect (initial—aged/initial) being less than 40%, less than 30%, less than 20%, or less than 10%, even after exposure to conditions of relative humidity of 80% and a temperature of 50° C. over extended time periods, such as over 10, 20, 24, 30, 36, 40, 48, 60, 100, or 120 hours or greater.

EXAMPLES

Several polyvinyl alcohol copolymers formed from vinyl pivalate (VPi) and N-vinyl pyrrolidone (NVP) comonomer were generated to investigate water solubility of the resulting high syndiotactic polyvinyl alcohol compositions. Two additional solubilizing comonomers were also investigated, including N-(isobutoxymethyl) acrylamide (IBMA) and 4-vinyl-1,3-dioxolan-2-one (VEC).

The apparatus used to prepare the samples was a 5 liter glass reactor with reflux condenser, paddle stirrer and 2 metering vessels. The respective monomers, comonomers (such as VPi 637.87 g and NVP 5.42 g), and Methanol (130.91 g) were added into the reactor. The reactor was flushed with nitrogen at 20 psig. The reactants were stirred at 120 rpm and heated by means of an external temperature control system to an internal temperature of 60° C. When the internal temperature reached 60° C., initiator feed (TRIGONOX 23 0.16 g, Methanol 32.73 g) was started at 0.18 g/min feed rate. After 30 minutes from the start of the initiator charge, the delay feed (VPi 956.8 g, NVP 36.27 g) was started at 6.62 g/min feed rate. The initial charge was continued for 3 hours and the delay feed was continued for 2.5 hours. After both feeds were completed, polymerization was continued for 2 hours and methanol 1000 g was added to dilute the solution. After completion of the reaction, residual monomers were removed by heating the solution to 80° C. and the solution was discharged from the reactor. The resulting polyvinyl alcohol copolymer was saponified and isolated for analysis of physical and chemical properties (herein denoted as Sample 1). The remaining samples and three comparative samples were also formed using a similar procedure. The comparative samples were formed without use of a solubilizing comonomer (one VPi only, herein denoted as Comparative Sample 1, one with VPi and Vinyl Acetate (VAc), herein denoted as Comparative Sample 3, and one with VAc only, herein denoted as Comparative Sample 3). The formulations for the samples generated are shown in Table 1.

Comonomer content was measured using NMR spectroscopy. Viscosity was measured by dissolving the polymer to form a 4 wt % solution in water, and the viscosity was measured using a Brookfield viscometer at 20° C., spindle #'s 18-34, at 0.6-30 rpm. Diad tacticity and degree of hydrolysis (D.H.) were measured using $H^+$ NMR of a polymer/DMSO solution. The melting point temperature ($T_m$) and the glass transition temperature ($T_g$) were measured using the Differential Scanning calorimetry (DCS) with a heating speed of 10° C./min and temperature measurement range from 40° C. to 250° C.

Physical properties of the polymers were determined by first fanning a film having a target thickness of 50 microns (2 mil) by casting an aqueous solution of the composition onto a glass plate, which is leveled by gravity and allowed to dry to a moisture content in the range from about 6 wt % to about 15 wt %.

Tensile strength was measured by a tensile strength tester according to the method of ASTM D882B.

Polarizer was made by soaking the film in Iodine (I2)/Potassium iodide (KI) aqueous solutions at 25° C. for 15~60 sec. The ratio of I2, KI and water of the solution is 0.04 g, 0.4 g and 1000 g. The film was stretched to 5 times length after it was soaked in a 4.0 wt % boric acid water solution at 25° C. for 15 sec. The stretched film was dried at 80° C. for 5 minutes. The polarizer effect of stretched film was evaluated by UV/VIS spectrophotometer using the following equation:

$$PE(\%)=[(YP-YC)/(YP+YC)]^{1/2} \times 100$$

where YP and YC are the transmittances of the film superimposed on each other parallel and perpendicular to the direction of the elongation of the film. The durability for heat and humidity of the film was evaluated from the change ratio of polarizer effect after the film was kept in the constant temperature and humidity chamber for 24 hours (relative humidity of 80% and temperature of 50° C.).

Water solubility was measured by adding the sample polymer to water at 99° C. and observing the dissolution characteristics. A sample which dissolved at least 8.0 wt % was noted as ++, a sample which dissolved at least 6.0 wt % was noted as +, a sample which dissolved at least 4.0 wt % was noted as ◯, a sample which dissolved at least 1.0 wt % was noted as −, and a sample which dissolved less than 1.0 wt % was noted as −−. A comparison of the solubility and other analytical results is shown in Table 2 below.

TABLE 1

|  | Example 1 | Example 2 | Example 3 | Example 4 | Example 5 | Example 6 |
|---|---|---|---|---|---|---|
| Total VPi, g | 1753.16 | 1603.05 | 1611.41 | 1619.75 | 1628.07 | 1336.77 |
| Total NVP, g | 65.03 | 33.31 | 24.95 | 16.61 | 8.29 | 16.61 |
| Total VEC, g |  |  |  |  |  |  |
| Total IBMA, g |  |  |  |  |  |  |
| Total VAc, g |  |  |  |  |  |  |
| Total MeOH, g | 181.82 | 163.64 | 163.64 | 163.64 | 163.64 | 446.62 |
| Trigonox 23, g | 0.18 | 0.16 | 0.16 | 0.16 | 0.16 | 1.35 |
| Temperature, ° C. | 60.00 | 60.00 | 60.00 | 60.00 | 60.00 | 60.00 |

|  | Example 7 | Example 8 | Comparative 1 | Comparative 2 | Comparative 3 |
|---|---|---|---|---|---|
| Total VPi, g | 1356.54 | 1341.69 | 1636.36 | 532.94 |  |
| Total NVP, g |  |  | 0.00 |  |  |
| Total VEC, g | 7.09 |  |  |  |  |
| Total IBMA, g |  | 11.69 |  |  |  |
| Total VAc, g |  |  |  | 1074.2 | 1636.36 |
| Total MeOH, g | 136.36 | 446.62 | 163.64 | 192.86 | 163.64 |
| Trigonox 23, g | 0.14 | 1.35 | 0.16 | 0.07 | 0.16 |
| Temperature, ° C. | 60.00 | 60.00 | 60.00 |  | 60.00 |

TABLE 2

| | Comonomer Loading (NMR), mol % | 4% viscosity, cP | s-diad % | water solubility | Tm, °C | Tensile Strength, psi | Polarizer Effect (@570 nm), % | Change of Polarizer Effect, % |
|---|---|---|---|---|---|---|---|---|
| Example 1 | 7.8 | 2232 | 61.3 | ++ | 187.0 | 9766 | 99.8 | 33.7 |
| Example 2 | 4.5 | 234 | 62.1 | + | 201.5 | 12812 | 99.9 | 23.4 |
| Example 3 | 3.8 | 1320 | 62.45 | + | 209.6 | 10342 | 99.7 | 22.6 |
| Example 4 | 2.1 | 38032 | 61.35 | ○ | 215.6 | 11607 | 99.8 | 18.5 |
| Example 5 | 1.5 | 18446 | 61.2 | ○ | 230.4 | 12135 | 99.8 | 11.4 |
| Example 6 | 1.2 | 1430 | 63.2 | + | 221.1 | 12333 | 99.8 | 16.3 |
| Example 7 | 1.2 | 14232 | 62.1 | ○ | 229.1 | 11234 | 99.8 | 10.2 |
| Example 8 | 1.3 | 1127 | 62.6 | + | 211.3 | 10564 | 99.8 | 20.1 |
| Comparative 1 | 0 | ND | 61.75 | −− | 234.0 | ND | ND | ND |
| Comparative 2 | 0 | 121.2 | 57.5 | + | 221.1 | 14475 | 99.9 | 82.2 |
| Comparative 3 | 0 | 80.2 | 53.6 | ++ | 210.4 | 10469 | 99.4 | 66.7 |

As shown in Table 2, diad tacticity of each sample, where measured, was greater than 61%. Saponification (or degree of hydrolysis) was also in excess of 99%.

As expected, the high syndiotactic polyvinyl alcohol composition without a solubilizing comonomer (Comparative Sample 1), exhibited poor solubility in water at 99° C. In contrast, incorporating a solubilizing comonomer, such as N-vinyl pyrrolidone, may result in good to excellent water solubility, as shown by Samples 1-6). While Comparative Samples 2 and 3 may exhibit fair water solubility, the change in polarizer effect of the resulting films is unacceptably high.

As described above, embodiments disclosed herein provide a polyvinyl alcohol composition having a high degree of syndiotacticity while remaining water soluble. Embodiments disclosed herein may advantageously provide for ease of processing (including polymerization and conversion to end products), use of less toxic solvents, and use of less sever operating conditions. For example, water soluble high syndiotactic polyvinyl alcohol copolymers according to embodiments herein may be cast into a film from a water solution. The polarizer films from water soluble high syndiotactic polyvinyl alcohol copolymers and iodine herein may also exhibit high polarizer effect and high temperature and humidity resistance. Further, embodiments herein may provide for use of less plasticizers or humectants to achieve a desired effect due to the soluble nature of the copolymers.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A composition comprising:
    a water soluble polyvinyl alcohol copolymer having a diad syndiotacticity of greater than about 60% and less than about 70%, the water soluble polyvinyl alcohol polymer comprising N-vinyl pyrrolidone comonomer in an amount from about 5 mol % up to about 20 mol %;
    wherein the composition is soluble in water at a concentration of 6 wt % at a temperature of less than 100° C.

2. The composition of claim 1, wherein the water soluble polyvinyl alcohol copolymer comprises up to about 25 mol % of a solubilizing comonomer.

3. The composition of claim 1, wherein the water soluble polyvinyl alcohol comprises:
    one or more monomers selected from the group consisting of vinyl pivalate, vinyl trifluoroacetate, vinyl trichloroacetate, and vinyl formate; and
    one or more solubilizing comonomers selected from the group consisting of: N-vinyl pyrrolidone, N-vinyl imidazole, N-vinyl caprolactam, N-vinyl formamide, 2-acrylamido-2-methyl propane sulfonic acid, acrylamide, N,N-dimethyl acrylamide, N-(isobutoxymethyl) acrylamide, vinyl tert-butyl ether, vinyl trimethylsilyl ether, acrylic acid, crotonic acid, itaconic acid, maleic acid, allyl alcohol, hydroxypolyethoxy allyl ether, vinyl sulfonate, sodium 1-allyloxy-2-hydroxypropyl sulfonate, 3-dimethylamino propyl methacrylamide, and 4-vinyl-1,3-dioxolan-2-one.

4. The composition of claim 1, wherein the water soluble polyvinyl alcohol comprises at least 80 mol % hydrolyzed vinyl pivalate.

5. The composition of claim 1, wherein the composition is soluble in water at a concentration of at least 6 wt % at a temperature in the range from about 90° C. to less than 100° C.

6. The composition of claim 1, wherein the water soluble polyvinyl alcohol has a degree of hydrolysis of at least 95%.

7. A polarizing film comprising the composition of claim 1 and iodine.

8. The polarizing film of claim 7, wherein the film has a polarizing effect of at least 98%.

9. The polarizing film of claim 7, wherein the film has a polarizer effect change ratio of less than 50% measured after aging at a relative humidity of 80% and a temperature of 50° C. for 24 hours.

10. A method of preparing a polarizing film, comprising:
    dissolving a water soluble polyvinyl alcohol copolymer comprising N-vinyl pyrrolidone comonomer in an amount from about 5 mol % up to about 20 mol % and having a diad syndiotacticity in the range from greater than about 60% to less than about 70%, at a concentration of at least 6 wt % in water at a temperature of less than 100° C. to form an aqueous solution;
    casting a film from the aqueous solution;
    infusing the film with iodine to form a polyvinyl alcohol-iodine complex; and
    stretching the film.

11. The process of claim 10, wherein the method is performed under ambient pressure conditions.

12. The process of claim 10, wherein the infusing comprises contacting the film with an iodine solution at a temperature of about 25° C. for a time period of less than 2 minutes.

13. The process of claim 12, wherein the infusing comprises contacting the film with an iodine solution at a temperature of about 25° C. for a time period in the range from about 15 seconds to about 60 seconds.

14. A process for forming a water-soluble high syndiotactic polyvinyl alcohol composition, comprising:

copolymerizing at least one of vinyl pivalate, vinyl trifluoroacetate, vinyl trichloroacetate, and vinyl formate and at least one solubilizing comonomer to form a copolymer;

saponifying the copolymer to produce a polyvinyl alcohol copolymer having a degree of hydrolysis of at least 95%;

wherein the polyvinyl alcohol copolymer comprises N-vinyl pyrrolidone comonomer in an amount from about 5 mol % up to about 20 mol %, has a diad syndiotacticity of greater than about 60% to less than about 70%, and is completely soluble in water at a temperature of less than 100° C. at concentrations of greater than 6 wt %.

15. The process of claim 14, wherein the water soluble polyvinyl alcohol copolymer comprises up to about 25 mol % of a solubilizing comonomer.

16. The process of claim 14, wherein the water soluble polyvinyl alcohol comprises one or more solubilizing comonomers selected from the group consisting of: N-vinyl pyrrolidone, N-vinyl imidazole, N-vinyl caprolactam, N-vinyl formamide, 2-acrylamido-2-methyl propane sulfonic acid, acrylamide, N,N-dimethyl acrylamide, N-(isobutoxymethyl) acrylamide, vinyl tert-butyl ether, vinyl trimethylsilyl ether, acrylic acid, crotonic acid, itaconic acid, maleic acid, ally alcohol, hydroxypolyethoxy allyl ether, vinyl sulfonate, sodium 1-allyloxy-2-hydroxypropyl sulfonate, 3-dimethylatnino propyl methacrylamide, and 4-vinyl-1,3-dioxolan-2-one.

17. The process of claim 14, wherein the water soluble polyvinyl alcohol is soluble in water at a concentration of at least 6 wt % at a temperature in the range from about 90° C. to less than 100° C.

* * * * *